United States Patent
Cassaro et al.

(10) Patent No.: US 6,517,116 B1
(45) Date of Patent: Feb. 11, 2003

(54) PIPE-SHAPED SOCKET

(75) Inventors: Antonio Cassaro, Maintal (DE); Carsten Pescheck, Bruchköbel (DE); Harald Sachs, Frankfurt am Main (DE); Christoph Steinkamp, Bieber (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 10/002,929

(22) Filed: Nov. 15, 2001

(30) Foreign Application Priority Data

Nov. 17, 2000 (DE) .......................... 100 56 974

(51) Int. Cl.⁷ ................................................ F16L 39/00
(52) U.S. Cl. ........................ 285/189; 285/423; 285/921
(58) Field of Search ............................... 285/189, 423, 285/319, 921; 137/202, 587

(56) References Cited

U.S. PATENT DOCUMENTS

| | | | | |
|---|---|---|---|---|
| 4,743,051 A | * | 5/1988 | Proni ........................... | 285/319 |
| 4,966,189 A | * | 10/1990 | Harris ......................... | 137/587 |
| 5,000,491 A | * | 3/1991 | Bartholomew ................ | 285/110 |
| 5,139,043 A | * | 8/1992 | Hyde et al. .................. | 137/375 |
| 5,303,963 A | * | 4/1994 | McNaughton et al. ... | 285/140.1 |
| 5,443,098 A | * | 8/1995 | Kertesz ....................... | 138/109 |
| 5,931,509 A | * | 8/1999 | Bartholomew .............. | 285/319 |
| 5,992,895 A | * | 11/1999 | Steinkamp .................. | 285/319 |
| 6,173,994 B1 | * | 1/2001 | Ketcham .................... | 285/233 |
| 6,189,567 B1 | * | 2/2001 | Foltz .......................... | 137/587 |

FOREIGN PATENT DOCUMENTS

DE       195 35 413 C1      10/1996

* cited by examiner

*Primary Examiner*—Eric K. Nicholson
(74) *Attorney, Agent, or Firm*—Friedrich Kueffner

(57) ABSTRACT

A pipe-shaped socket for attachment to an opening of a plastic container has a tubular part and an annular part, both of thermoplastic material. The annular part has a greater swelling capacity than the tubular part. The tubular part has a first end with first and second outer ribs. The annular part has first and second rims, wherein the diameter of the first rim is smaller than that of the second rim. The second rim is material-bonded to the container opening. The annular part and the tubular part are connected by injection-molding, with the first rim positioned between the outer ribs. The second rib of the tubular part between the first and second rims of the annular part has a circumferential flexible lip welded to the inner side of the annular part. The flexible lip extends toward the second rim of the annular part and covers most of its inner side.

4 Claims, 2 Drawing Sheets

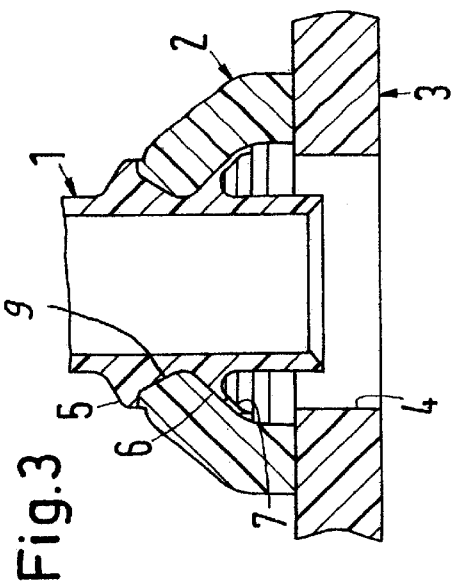
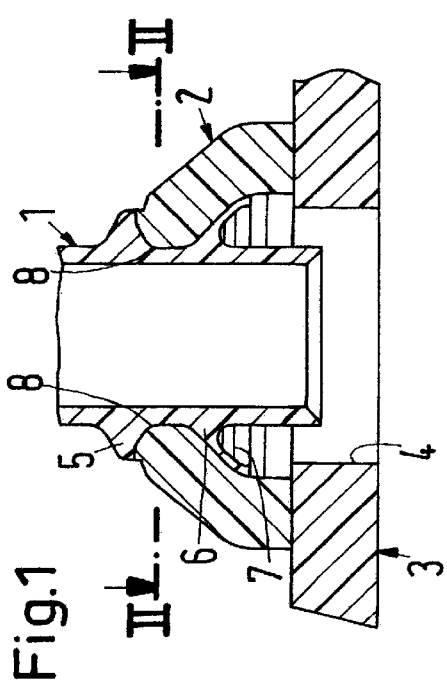
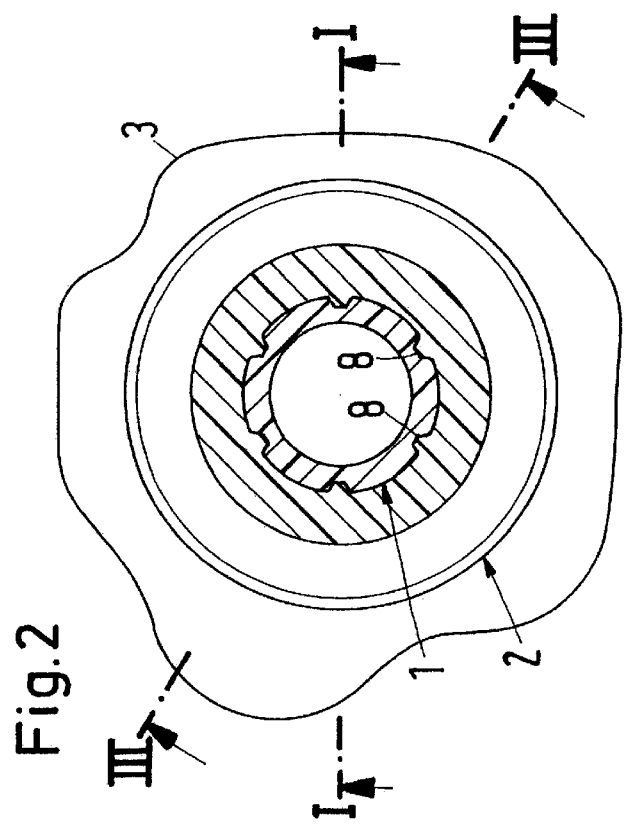

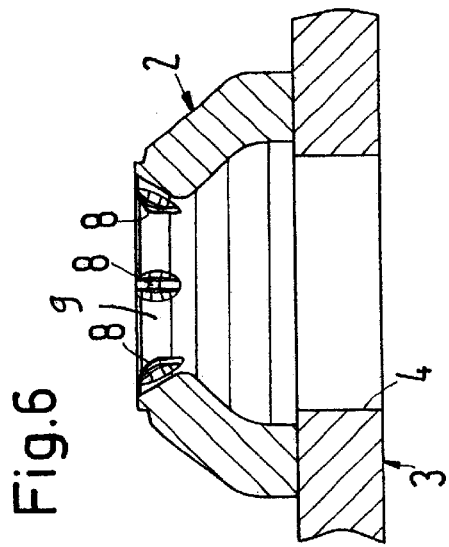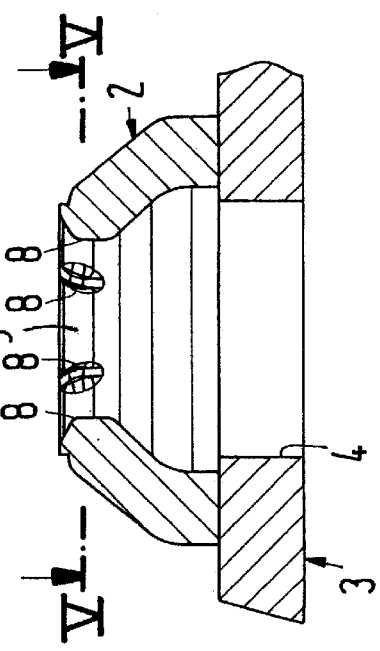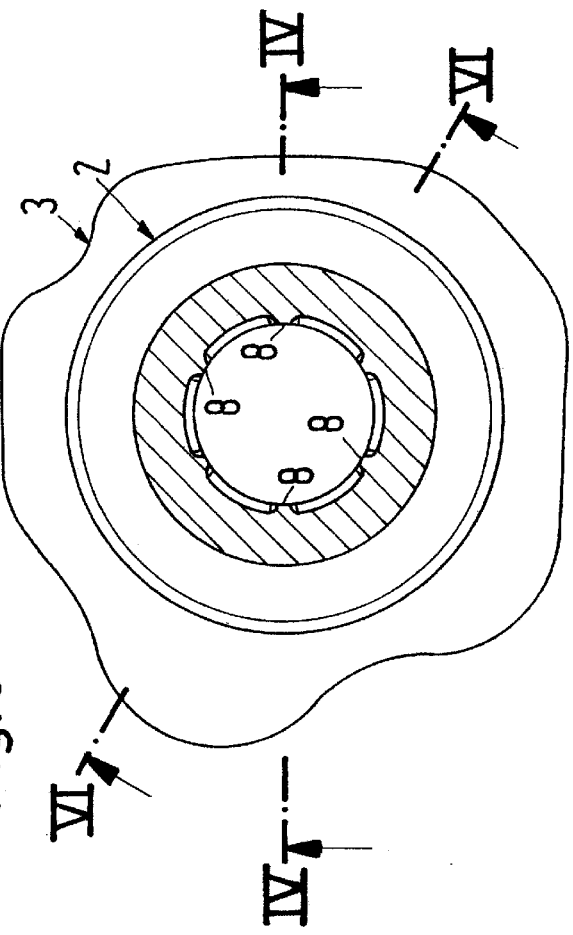

PIPE-SHAPED SOCKET

BACKGROUND OF THE INVENTION

1. Field of the Invention

The invention relates to a pipe-shaped socket to be connected to an opening of a container comprised primarily of thermoplastic material, in particular, polyethylene. The pipe-shaped socket comprises a tubular first part, which is comprised primarily of a thermoplastic material which has at most a slight swelling capacity, and further comprised of an annular second part of primarily thermoplastic material which has a greater swelling capacity than the first plastic material. The annular second part with the first rim having a smaller diameter is connected in a material-bonding and positive-locking way to the first part between two outer ribs surrounding the first part by injection molding one of the first and second parts about the other one of the first and second parts and is to be fastened with the second rim having the larger diameter to the edge of the opening of the container by material bonding.

2. Description of the Related Art

Devices of the aforementioned kind are known, for example, from German patent application No. 195 33 920 A1. The socket described therein has an annular second part of a substantially S-shaped stepped cross-section with a radially inwardly projecting flange projecting between the outer ribs of the first part and a radially outwardly projecting second flange. The container opening has a diameter which widens from the interior to the exterior in a stepped fashion so that an annular flange results which projects radially inwardly within the container opening at the inner side of the container. The second radial outer flange of the annular second part is fastened by material bonding onto this annular flange. The type of material bonding is not disclosed. If they were to be fused by applying heat, an axial pressure would have to be applied onto the radial surfaces of the second annular flange and the flange in the opening contacting one another. This would entail the risk that the flange in the opening and also the second flange of the ring would bend. An adhesive connection would require a material-intensive and labor-intensive application of an adhesive or bonding agent. When the container contains fuels such as gasoline or diesel fuel, there is the risk that the annular second part will swell when the exposed part of its inner side comes into contact with the fuel. This entails the risk that the outer rib of the first part resting against the inner side of the annular second part would tear and that, moreover, the fuel would penetrate between the radially inner first flange of the ring and the axially inner rib of the tubular first part and that the swelling would continue directly to the tubular first part so that the connection between the first and second parts finally would dissolve or at least begin to leak so that fuel can flow from the container.

SUMMARY OF THE INVENTION

It is an object of the present invention to provide a pipe-shaped socket of the aforementioned kind in which the connection of the two parts can withstand swelling of the plastic material of the second part upon contact with a liquid which will cause it to swell, in particular, fuels such as gasoline or diesel fuel, and the connection between the second part and the container can be produced reliably as a fused or welded connection.

In accordance with the present invention, this is achieved in that the second part is substantially bell-shaped and the outer rib positioned between its rims comprises a circumferential flexible lip welded to the inner side of the second part, the lip extending to the second rim of the second part so that the majority of the inner side of the second part is covered by the first part.

In this embodiment of the two parts, the lip which forms an extension of the axially inwardly positioned outer rib of the first part first protects additionally a large portion of the inner side of the second part against contact with the fuel contained in the container. The lip leaves a small portion of the inner side of the second part exposed so that the second part upon contact with a liquid, such as fuel, can still swell. The swelling, however, would take place primarily in the direction toward the substantially freely exposed outer side of the second part without this posing the risk of tearing within the second part. Since the lip is flexible, it can also yield to a swelling toward the inner side of the second part without tearing. The fuel therefore cannot penetrate farther between the outer ribs, as would be the case for a tear in the inner rib. Between the end face of the rim of the annular second part having the larger diameter and the outer side of the edge area of the opening in the container, a welding or fusing connection can be simply provided, for example, by butt-welding, wherein the end face of the rim having the larger diameter is pressed against the outer side of the container, without the container edge deforming, because a shoulder of the diameter of the container edge and thus of the radially inner, thinner flange of the container edge on which the rim of the annular second part would be seated can be eliminated as a result of the second part radially widening in the direction of the container. Not to cover a small portion of the inner side of the second part by the lip has the advantage that the welding bead, resulting when producing the welding connection by pressing the rim of the second part having the larger diameter against the outer side of the container, can expand unimpededly.

Preferably, the inner side of the first rim of the second part is provided with radial projections which engage the material of the first part between the outer ribs. This results in an additional positive-locking rotational securing action between the two parts so that the connection between the two parts withstands a torsional force which, when exerting an accidental torque about the longitudinal center axis of the tubular first part, is greater between the two parts than between the second part and the container.

It is furthermore beneficial when the projections on the second part extend axially and when their radial (transverse) section as well as their axial section has a substantially trapezoidal contour. This shape ensures that upon injection molding around the rim of the annular second part having the smaller diameter, the material of the first part will tightly flow about the projections without forming bubbles during molding of the first part in the mold.

Moreover, the first rim of the second part can have a radially inwardly descending slanted portion. This slanted portion ensures that the pressure of the material of the first part which is injected axially against the slanted portion into the mold provides a radial component which presses the second part securely against the inner side of the mold so that the second part is less easily deformed in the axial direction during injection molding of the first part.

BRIEF DESCRIPTION OF THE DRAWING

In the drawing:

FIG. 1 is an axial section of a pipe-shaped socket according to the invention fastened to the edge of an opening of a container by a welding connection;

FIG. 2 shows the section II—II of FIG. 1;

FIG. 3 shows the section III—III of FIG. 2;

FIG. 4 shows the arrangement according to FIG. 1 without the inner part of the pipe-shaped socket;

FIG. 5 shows the section V—V of FIG. 4;

FIG. 6 shows the section VI—VI of FIG. 5.

DESCRIPTION OF THE PREFERRED EMBODIMENTS

FIGS. 1–6 show a pipe-shaped socket comprised of a tubular first part 1 which is comprised primarily of thermoplastic material, in particular, polyamide, and an annular second part 2, which is comprised primarily of thermoplastic material, in particular, polyethylene, in this case high-density polyethylene (HDPE). Both parts 1 and 2 can be reinforced with fiberglass particles and/or carbon particles or the like; preferably, part 1 is reinforced and part 2 is not reinforced. As an alternative, part 1 can be reinforced HDPE and part 2 can be HDPE without reinforcement. In all cases, part 1 is hardly swellable (has a very low swelling capacity) and part 2 is more strongly swellable by fuels, such as gasoline or diesel fuel, or other liquids.

The socket is connected by a welding connection to the exterior side of a container 3, which is comprised primarily of thermoplastic material, in particular, polyethylene, and in the described embodiment is a fuel tank of a motor vehicle, so as to be positioned about an opening 4 of the container 3. The part 1 is only partially illustrated. The portion that is not illustrated can be a straight or angled extension of the illustrated portion of part 1 and can be configured for connecting thereto a hose, for example, by means of a plug connection or by means of a hose clamp. Part 1 has two circumferentially extending outer ribs 5 and 6 wherein the outer rib 6 is substantially conically extended by a circumferential lip 7 which is flexible. It extends toward the container 3 and widens in this direction.

The annular second part 2 is substantially bell-shaped and has radial projections 8 at the inner side of the rim remote from the container 3. The projections 8 extend approximately axially on a slanted portion 9 of this rim which descends radially inwardly. The axial cross-section and the transverse (radial) cross-section of the projections 8 have a substantially trapezoidal contour; see, for example, FIGS. 4 and 6.

First, the part 2 is produced in a mold by an injection molding process. Subsequently, the part 1 is also produced by injection molding in a mold receiving the part 2 and, at the same time, is injection-molded about the inner side of the part 2 so that the rim of the second part 2, having a smaller diameter and being positioned remote from the container 3, surrounds the first part 1 between the outer ribs 5 and 6 and is connected by material bonding to the part 1. When injection molding the part 1 about the part 2, at the same time the projections 8 are embedded in the molten material of part 1. In the solidified state, the projections 8 engaging the material of the part 1 then provide a rotational securing action against an accidental rotation of the two parts 1 and 2 relative to one another. When injection molding the part 1 about the part 2, the part 2, as a result of the pressure of the material of the part 1 being injected axially from above into the mold (FIGS. 1 and 2), is forced, as a result of the slanted portion 9, radially outwardly tightly against the inner side of the mold so that the part 2 is less easily deformed by the axial injection pressure component.

Upon injection molding of the part 1 into the part 2, the flexible lip 7 which is connected (material-bonded) to the inner side of the second part 2 and extends circumferentially, covers a significant portion of the inner side of the second part 2 while the part 2 is substantially exposed, with the exception of its upper edge, at the radially outer side.

Instead of the part 1 being injection molded at the inner side about the pre-fabricated part 2, it is also possible to injection-mold the part 2 externally about the part 1.

After the two parts 1 and 2 have been connected by material bonding, the part 2 with its end face facing the container 3 is welded or fused to the outer side of the container 3 in the edge area of the opening at a radial spacing from the opening 4. For producing the welding connection, a butt-welding process with heat reflectors is employed. This is carried out such that a metal plate in a heated state is arranged between the end face of the part 2 and the outer side of the container 3 so that the surfaces to be connected are melted. Subsequently, the heated plate is removed. Then, the end face of the part 2 and the outer side of the container 3 are pressed against one another in the molten state. Since the lip 7 provides a narrow annular surface between it and the end face of the part 2, the welding bead, resulting during welding of the part 2 onto the container 3, can be deflected not only radially outwardly but also radially inwardly. Instead of the butt-welding method, it is also possible to employ other welding processes, for example, friction welding or ultrasound welding methods.

One end of the part 1 projects into the opening 4 of the container 3 but leaves a minimal intermediate space between its outer side and the inner side of the opening 4. In this connection, it must be taken into account that the illustrations in FIGS. 1 through 6 correspond to approximately a scale of 5:1. The actual dimensions are thus considerably smaller than the ones illustrated.

As a result of the gap between the end of the part 1 and the-opening 4, fuel from the container 3 can thus reach the axial narrow annular surface at the inner side of the part 2 between the lip 7 and the outer side of the container 3. Since the material of the part 2, having a greater swelling capacity than that of the part 1, swells upon contact with the gasoline or diesel fuel and the part 2 is exposed at its radial outer side while its inner side is covered over the majority thereof, the swelling would act stronger radially outwardly than inwardly. The flexible lip 7 would give without tearing to a swelling occurring inwardly within the area of the lip 7. The fuel therefore could not come into contact with the inner side of the part 2 in the area of the lip 7. Also, penetration of the fuel along the connecting surface between the sealing lip 7 and the inner side of the part 2 up to the vicinity of the positive-locking and material-bonding connecting area between the rim of the part 2 having the smaller diameter and the part 1 would be substantially prevented as a result of the long travel path which would have to be covered by the fuel up to that point.

The risk of an excessive swelling of the part 2 upon contact-with fuel in such a way that the part 2 would suffer a tear or would be deformed excessively, is thus substantially excluded. Accordingly, the connection between the parts 1 and 2 as well as between the part 2 and the container 3 would therefore also remain unscathed and sealtight.

While specific embodiments of the invention have been shown and described in detail to illustrate the inventive principles, it will be understood that the invention may be embodied otherwise without departing from such principles.

What is claimed is:

1. A pipe-shaped socket for attachment to an opening of a container of primarily thermoplastic material, the pipe-shaped socket comprising:

a tubular first part comprised primarily of a first thermoplastic material that has at most a slight swelling capacity and provided with a first end with first and second outer ribs;

an annular second part comprised primarily of a second thermoplastic material that has a swelling capacity that is greater than that of the first thermoplastic material;

the annular second part having a first rim of a first diameter and a second rim of a second diameter, wherein the first diameter is smaller than the second diameter;

wherein the second rim is configured to be connected by material-bonding to an edge area of the opening of the container;

wherein the annular second part is connected with the first rim in a material-bonding and positive-locking way to the tubular first part between the first and second outer ribs by injection molding one of the first and second parts about the other one of the first and second parts;

wherein the annular second part is bell-shaped and has an inner side;

wherein the second outer rib of the tubular first part positioned between the first and second rims of the annular second part has a circumferential flexible lip welded to the inner side of the annular second part; and wherein the flexible lip extends toward the second rim of the annular second part so that a majority of the inner side of the annular second part is covered by the tubular first part.

2. The pipe-shaped socket according to claim 1, wherein the first rim of the annular second part has radial projections located on the inner side of the annular second part, wherein the radial projections engage the material of the tubular first part between the first and second outer ribs.

3. The pipe-shaped socket according to claim 2, wherein the radial projections extend axially along the annular second part and wherein a cross-section of the projections in a radial plane as well as in an axial plane of the annular second part has a substantially trapezoidal contour.

4. The pipe-shaped socket according to claim 1, wherein the first rim of the annular second part has a slanted portion with a radially inwardly descending slope.

* * * * *